United States Patent
Krisko et al.

(10) Patent No.: US 6,974,629 B1
(45) Date of Patent: Dec. 13, 2005

(54) LOW-EMISSIVITY, SOIL-RESISTANT COATING FOR GLASS SURFACES

(75) Inventors: Annette J. Krisko, Prairie de Sac, WI (US); Bob Bond, Spring Green, WI (US); Roger Stanek, Spring Green, WI (US); Gary Pfaff, Cazenovia, WI (US); Klaus Hartig, Avcoa, WI (US)

(73) Assignee: Cardinal CG Company, Eden Prairie, MN (US)

( * ) Notice: Subject to any disclaimer, the term of this patent is extended or adjusted under 35 U.S.C. 154(b) by 0 days.

(21) Appl. No.: 09/868,543

(22) PCT Filed: Aug. 6, 1999

(86) PCT No.: PCT/US99/17876

§ 371 (c)(1),
(2), (4) Date: Jan. 15, 2002

(87) PCT Pub. No.: WO00/37376

PCT Pub. Date: Jun. 29, 2000

(51) Int. Cl.[7] .................................. B32B 17/06
(52) U.S. Cl. .................. 428/432; 428/426; 428/430; 428/446; 428/469; 428/472; 428/699; 428/702; 427/163.1; 427/164; 427/165; 427/166; 204/192.1
(58) Field of Search ................. 428/426, 432, 428/430, 446, 469, 472, 673, 699, 702; 427/163.1, 164, 165, 166; 204/192.1

(56) References Cited

U.S. PATENT DOCUMENTS

| | | |
|---|---|---|
| 2,808,351 A | 10/1952 | Colbert et al. |
| 2,780,553 A | 2/1957 | Pawlyk |
| 3,505,092 A | 4/1970 | Ryan et al. |
| 3,528,906 A | 9/1970 | Cash et al. |

(Continued)

FOREIGN PATENT DOCUMENTS

| | | |
|---|---|---|
| CA | 2290999 | 12/1998 |
| DE | 43 13 284 | 10/1994 |
| EP | 0 328 257 | 8/1989 |
| EP | 0 470 379 A | 2/1992 |
| EP | 0 637 572 | 8/1994 |
| EP | 0 515 847 B1 | 2/1995 |
| EP | 0 689 962 A | 6/1995 |
| EP | 0 820 967 A | 7/1997 |
| JP | 01 014 129 | 7/1987 |
| JP | 3-122274 | 5/1991 |
| JP | 3-187039 A | 8/1991 |
| JP | 3-193872 | 8/1991 |

(Continued)

OTHER PUBLICATIONS

Veersamy, et al., "Optical and Electronic Properties of Amorphous Diamond." *Diamond and Related Materials*, vol. 2 (1993), pp. 782–787. (no month).

"Surface Hardening of Ceramic and Glass Materials," *IBM Technical Disclosure Bulletin*, vol. 36, Issue 1 (Jan. 1993), p. 225.

"Surface Hardening of Ceramic and Glass Materials," *IBM Technical Disclosure Bulletin*, vol. 36, Issue 3 (Mar. 1993), pp. 291–292.

*Primary Examiner*—Deborah Jones
*Assistant Examiner*—Andrew Piziali
(74) *Attorney, Agent, or Firm*—Fredrikson & Byron, PA (57) ABSTRACT

A coated article (e.g., a coated glass article) is provided with a low-emissivity, water-sheeting coating. The coating comprises a sputtered silica layer over a pyrolytically-applied dielectric layer. In certain embodiments, an automobile windscreen is provided with a low-emissivity, water-sheeting coating. Also provided are methods of rendering a surface of a substrate (e.g., a pane of glass) resistant to soiling and staining, such as by depositing on the substrate a low-emissivity, water-sheeting coating.

25 Claims, 5 Drawing Sheets

U.S. PATENT DOCUMENTS

| | | | |
|---|---|---|---|
| 3,840,451 | A | 10/1974 | Golyanov et al. |
| 3,844,924 | A | 10/1974 | Cunnigham et al. |
| 3,852,098 | A | 12/1974 | Bloss et al. |
| 3,925,182 | A | 12/1975 | Carmichael et al. |
| 3,968,018 | A | 7/1976 | Lane et al. |
| 3,970,037 | A | 7/1976 | Sopko |
| 3,990,784 | A | 11/1976 | Gelber |
| 4,045,125 | A | 8/1977 | Farges |
| 4,052,520 | A | 10/1977 | Chang et al. |
| 4,060,660 | A | 11/1977 | Carlson et al. |
| 4,107,350 | A | 8/1978 | Berg et al. |
| 4,130,672 | A | 12/1978 | Onoki et al. |
| 4,166,018 | A | 8/1979 | Chapin |
| 4,194,022 | A | 3/1980 | Gillery |
| 4,212,663 | A | 7/1980 | Aslami |
| 4,212,903 | A | 7/1980 | Schnell et al. |
| 4,214,014 | A | 7/1980 | Hofer et al. |
| 4,261,722 | A | 4/1981 | Novak et al. |
| 4,332,922 | A | 6/1982 | Kossmehl et al. |
| 4,351,861 | A | 9/1982 | Henery |
| 4,377,613 | A | 3/1983 | Gordon |
| 4,466,258 | A | 8/1984 | Sando et al. |
| 4,485,146 | A | 11/1984 | Mizuhashi et al. |
| 4,486,286 | A | 12/1984 | Lewin et al. |
| 4,503,125 | A | 3/1985 | Nelson et al. |
| 4,504,519 | A | 3/1985 | Zelez |
| 4,568,622 | A | 2/1986 | Minami et al. |
| 4,569,738 | A | 2/1986 | Kieser et al. |
| 4,571,350 | A | 2/1986 | Parker et al. |
| 4,661,409 | A | 4/1987 | Kieser et al. |
| 4,704,339 | A | 11/1987 | Green et al. |
| 4,713,311 | A | 12/1987 | Senske et al. |
| 4,717,622 | A | 1/1988 | Kurokawa et al. |
| 4,725,345 | A | 2/1988 | Sakamoto et al. |
| 4,728,529 | A | 3/1988 | Etzkorn et al. |
| 4,732,454 | A | 3/1988 | Saito et al. |
| 4,737,252 | A | 4/1988 | Hoffman |
| 4,769,291 | A | 9/1988 | Belkind et al. |
| 4,777,090 | A | 10/1988 | Ovshinsky et al. |
| 4,780,334 | A | 10/1988 | Ackerman |
| 4,816,127 | A | 3/1989 | Eltoukhy |
| 4,849,081 | A | 7/1989 | Ross |
| 4,851,095 | A | 7/1989 | Scobey et al. |
| 4,859,493 | A | 8/1989 | Lemelson |
| 4,882,827 | A | 11/1989 | Kusumi et al. |
| 4,894,133 | A | 1/1990 | Hedgcoth |
| 4,915,977 | A | 4/1990 | Okamoto et al. |
| 4,919,778 | A | 4/1990 | Dietrich et al. |
| 4,961,958 | A | 10/1990 | Desphandey et al. |
| 4,981,568 | A | 1/1991 | Taranko et al. |
| 5,008,002 | A | 4/1991 | Uno et al. |
| 5,026,415 | A | 6/1991 | Yamamoto et al. |
| 5,032,421 | A | 7/1991 | Sarma et al. |
| 5,047,131 | A | 9/1991 | Wolfe et al. |
| 5,073,241 | A | 12/1991 | Watanabe |
| 5,073,450 | A | 12/1991 | Nietering |
| 5,090,985 | A | 2/1992 | Soubeyrand et al. |
| 5,106,671 | A | 4/1992 | Amberger et al. |
| 5,107,643 | A | 4/1992 | Swensen |
| RE34,035 | E | 8/1992 | Dimigen et al. |
| 5,139,633 | A | 8/1992 | Kashida et al. |
| 5,171,414 | A | 12/1992 | Amberger et al. |
| 5,190,807 | A | 3/1993 | Kimock et al. |
| 5,201,926 | A | 4/1993 | Szczyrbowski et al. |
| 5,209,996 | A | 5/1993 | Kashida et al. |
| 5,211,759 | A | 5/1993 | Zimmermann et al. |
| 5,245,468 | A | 9/1993 | Demiryont et al. |
| 5,284,539 | A | 2/1994 | McKernan et al. |
| 5,286,524 | A | 2/1994 | Slutz et al. |
| 5,302,449 | A | 4/1994 | Eby et al. |
| 5,318,830 | A | 6/1994 | Takamatsu et al. |
| 5,346,600 | A | 9/1994 | Nieh et al. |
| 5,366,764 | A | 11/1994 | Sunthankar |
| 5,378,527 | A | 1/1995 | Nakanishi et al. |
| 5,394,269 | A | 2/1995 | Takamatsu et al. |
| 5,401,543 | A | 3/1995 | O'Neill |
| 5,415,756 | A | 5/1995 | Wolfe et al. |
| 5,424,130 | A | 6/1995 | Nakanishi et al. |
| 5,453,459 | A | 9/1995 | Roberts |
| 5,470,661 | A | 11/1995 | Bailey et al. |
| 5,476,713 | A | 12/1995 | Abiko et al. |
| 5,482,602 | A | 1/1996 | Cooper et al. |
| 5,498,475 | A | 3/1996 | Takigawa et al. |
| 5,507,930 | A | 4/1996 | Yamashita et al. |
| 5,520,996 | A | 5/1996 | Balian et al. |
| 5,529,631 | A | 6/1996 | Yoshikawa et al. |
| 5,558,751 | A | 9/1996 | Mahler et al. |
| 5,569,501 | A | 10/1996 | Bailey et al. |
| 5,594,585 | A | 1/1997 | Komatsu |
| 5,595,825 | A | 1/1997 | Guiselin |
| 5,597,622 | A | 1/1997 | Zoller et al. |
| 5,605,609 | A | 2/1997 | Ando et al. |
| 5,607,723 | A | 3/1997 | Plano et al. |
| 5,614,196 | A | 3/1997 | Norris et al. |
| 5,618,590 | A | 4/1997 | Naruse et al. |
| 5,624,760 | A | 4/1997 | Collins et al. |
| 5,633,208 | A * | 5/1997 | Ishikawa .................... 438/699 |
| 5,643,423 | A | 7/1997 | Kimock et al. |
| 5,643,432 | A | 7/1997 | Qiu |
| 5,645,699 | A | 7/1997 | Sieck |
| 5,645,900 | A | 7/1997 | Ong et al. |
| 5,669,144 | A | 9/1997 | Hahn et al. |
| 5,674,625 | A | 10/1997 | Takahashi et al. |
| 5,679,431 | A | 10/1997 | Chen et al. |
| 5,683,561 | A | 11/1997 | Hollars et al. |
| 5,698,262 | A | 12/1997 | Soubeyrand et al. |
| 5,723,172 | A | 3/1998 | Sherman |
| 5,733,660 | A | 3/1998 | Makita et al. |
| 5,733,669 | A | 3/1998 | Veyhl et al. |
| 5,745,291 | A | 4/1998 | Jenkinson |
| 5,762,674 | A | 6/1998 | Maltby, Jr. et al. |
| 5,763,087 | A | 6/1998 | Falabella |
| 5,780,119 | A | 7/1998 | Dearnaley et al. |
| 5,789,040 | A | 8/1998 | Martinu et al. |
| 5,820,994 | A | 10/1998 | Gotoh et al. |
| 5,830,327 | A | 11/1998 | Kolenkow |
| 5,830,332 | A | 11/1998 | Babich et al. |
| 5,846,613 | A | 12/1998 | Neuville |
| 5,854,708 | A * | 12/1998 | Komatsu et al. ............. 359/512 |
| 5,888,593 | A | 3/1999 | Petrmichl et al. |
| 5,972,184 | A | 10/1999 | Hollars et al. |
| 6,074,981 | A * | 6/2000 | Tada et al. .................. 502/224 |
| 6,124,044 | A | 9/2000 | Swidler |
| 6,156,171 | A | 12/2000 | Hollars et al. |
| 6,165,598 | A * | 12/2000 | Nelson ...................... 428/212 |
| 6,165,616 | A | 12/2000 | Lemelson et al. |
| 6,210,750 | B1 | 4/2001 | Cho et al. |
| 6,261,693 | B1 | 7/2001 | Veerasamy |
| 6,277,507 | B1 | 8/2001 | Anzaki et al. |
| 6,299,981 | B1 | 10/2001 | Azzopardi et al. |
| 6,319,326 | B1 | 11/2001 | Koh et al. |
| 6,333,084 | B1 | 12/2001 | Woodard et al. |
| 6,365,010 | B1 | 4/2002 | Hollars |
| 6,397,776 | B1 | 6/2002 | Yang et al. |

FOREIGN PATENT DOCUMENTS

| | | |
|---|---|---|
| JP | 7-149545 | 6/1995 |
| JP | 7-508491 | 9/1995 |
| JP | 7-315874 | 12/1995 |
| JP | 7-315889 | 12/1995 |
| JP | 8-11631 | 1/1996 |

| | | | | | | |
|---|---|---|---|---|---|---|
| JP | 8-012378 | 1/1996 | | WO | WO 96/25534 | 8/1996 |
| JP | 8-109043 | 4/1996 | | WO | WO 97/11916 | 4/1997 |
| JP | 9-202651 | 8/1997 | | WO | WO 97/42351 | 11/1997 |
| JP | 10-36144 | 2/1998 | | WO | WO 98/23549 | 6/1998 |
| JP | 10-048805 A | 2/1998 | | | | |
| WO | WO 92 17621 A | 10/1992 | | * cited by examiner | | |

LOW-EMISSIVITY, SOIL-RESISTANT COATING FOR GLASS SURFACES

FIELD OF THE INVENTION

The present invention provides a coating for glass substrates and the like which resists accumulation of dirt and water stains. Coated glass substrates of the invention can be used in insulated glass units wherein the coating of the invention is carried on an exterior surface of one pane of glass while a reflective coating is applied on the opposite side of the same pane of glass.

BACKGROUND OF THE INVENTION

Keeping windows and other glass surfaces clean is a relatively expensive, time-consuming process. While cleaning any individual window is not terribly troublesome, keeping a larger number of windows clean can be a significant burden. For example, with modern glass office towers, it takes significant time and expense to have window washers regularly clean the exterior surfaces of the windows.

Windows and other glass surfaces can become "dirty" or "soiled" in a variety of ways. Two of the primary manners in which windows can collect dirt involve the action of water on the glass surface. First, the water itself can deposit or collect dirt, minerals or the like onto the surface of the glass. Obviously, dirty water landing on the glass will leave the entrained or dissolved dirt on the glass upon drying. Even if relatively clean water lands on the exterior surface of a window, each water droplet sitting on the window will tend to collect dust and other airborne particles as it dries. These particles and any other chemicals that become dissolved in the water will become more concentrated over time, leaving a characteristic spot or drying ring on the glass surface.

The second way in which water tends to give a window or other glass surface a soiled or less attractive appearance is tied to an attack on the glass surface itself. As a droplet of even relatively clean water sits on a glass surface, it will begin to leach alkaline components from the glass. For a typical soda lime glass, the soda and lime will be leached out of the glass, increasing the pH of the droplet. As the pH increases, the attack on the glass surface will become more aggressive. As a result, the glass that underlies a drying water droplet will become a little bit rougher by the time the water droplet completely dries. In addition, the alkaline components that were leached out of the glass will be redeposited on the glass surface as a drying ring. This dried alkaline material not only detracts from the appearance of the glass; it will also tend to go back into solution when the glass surface is wetted again, rapidly increasing the pH of the next water droplet to coalesce on the glass surface.

In storing and shipping plate glass, the presence of water on the surfaces between adjacent glass sheets is a chronic problem. One can take steps to shield the glass from direct contact with water. However, if the glass is stored in a humid environment, water can condense on the glass surface from the atmosphere.

This becomes more problematic when larger stacks of glass are collected. Large stacks of glass have a fairly large thermal mass and will take a long time to warm up. As a consequence, they will often be cooler than the ambient air when ambient temperature increases (e.g., in the morning), causing moisture in the air to condense on the surface of the glass. Due to limited air circulation, any moisture which does condense between the sheets of glass will take quite a while to dry. This gives the condensed moisture a chance to leach the alkaline components out of the glass and adversely affect the glass surface. The rate of attack can be slowed down somewhat by applying an acid to the surface of the glass. This is commonly done by including a mild acid, e.g., adipic acid, in the separating agent used to keep glass sheets from sticking to and scratching one another.

A number of attempts have been made to enable a glass sheet to keep a clean appearance longer. One avenue of current investigation is a "self-cleaning" surface for glass and other ceramics. Research in this area is founded on the ability of certain metal oxides to absorb ultraviolet light and photocatalytically break down biological materials such as oil, plant matter, fats and greases, etc. The most powerful of these photocatalytic metal oxides appears to be titanium dioxide, though other metal oxides which appear to have this photocatalytic effect include oxides of iron, silver, copper, tungsten, aluminum, zinc, strontium, palladium, gold, platinum, nickel and cobalt.

While such photocatalytic coatings may have some benefit in removing materials of biological origin, their direct impact on other materials is unclear and appears to vary with exposure to ultraviolet light. As a consequence, the above-noted problems associated with water on the surface of such coated glasses would not be directly addressed by such photocatalytic coatings.

A number of attempts have been made to minimize the effect of water on glass surfaces by causing the water to bead into small droplets. For example, U.S. Pat. No. 5,424,130 (Nakanishi, et al., the teachings of which are incorporated herein by reference) suggests coating a glass surface with a silica-based coating that incorporates fluoroalkyl groups. The reference teaches applying a silicone alkoxide paint onto the surface of the glass, drying the paint and then burning the dried paint in air. Nakanishi, et al. stress the importance of substituting part of the non-metallic atoms, i.e., oxygen in a layer of $SiO_2$, with a fluoroalkyl group. Up to 1.5% of the oxygen atoms should be so substituted. Nakanishi, et al. state that if less than 0.1% of the oxygen atoms are substituted with a fluoroalkyl group, the glass won't repel water properly because the contact angle of water on the glass surface will be less than 80°.

Such "water repellent" coatings do tend to cause water on the surface of the glass to bead up. If the coating is applied to an automobile windshield or the like where a constant flow of high velocity air is blowing over the surface, this water beading effect can help remove water from the glass surface by allowing the droplets to blow off the surface. However, in more quiescent applications, these droplets will tend to sit on the surface of the glass and slowly evaporate. As a consequence, this supposed "water repellent" coating will not solve the water-related staining problems noted above. To the contrary, by causing the water to bead up more readily, it may actually exacerbate the problem.

Other silica coatings have been applied to the surface of glass in various fashions. For example, U.S. Pat. No. 5,394,269 (Takamatsu, et al.) proposes a "minutely rough" silica layer on the surface of glass to reduce reflection. This roughened surface is achieved by treating the surface with a supersaturated silica solution in hydrosilicofluoric acid to apply a porous layer of silica on the glass sheet. By using a multi-component sol gel solution, they claim to achieve a surface which has small pits interspersed with small "islet-like land regions" which are said to range from about 50 to 200 nm in size. While this roughened surface may help reduce reflection at the air/glass interface, it appears unlikely to reduce the water-related staining problems discussed above. If anything, the porous nature of this coating appears more likely to retain water on the surface of the glass. In so doing, it seems probable that the problems associated with the long-term residence of water on the glass surface would be increased.

Most low-emissivity glass articles have an infrared-reflective coating on a protected interior surface of the structure rather than on an exposed exterior surface. For example, in a common automobile windshield having an outer pane of glass laminated to an inner pane of glass with a tear-resistant plastic layer, an infrared reflective coating is commonly applied to one of the glass surfaces immediately adjacent the plastic layer. This helps reduce the transmission of energy as infrared radiation through the windshield, helping maintain a comfortable temperature in the cabin of the vehicle.

However, such an internal infrared reflective coating does not limit emissivity of the outer pane of glass. During the night, for example, the exterior pane of the windshield will lose heat energy to the ambient atmosphere through both convection and infrared radiation to the ambient atmosphere. As a result, the exterior pane of the windshield can cool fairly quickly. When the ambient temperature starts to rise, this cool exterior pane may precipitate moisture from the ambient air, either in liquid form as dew or in frozen form as frost, if its temperature is at or below the "dew point" of the ambient atmosphere when the ambient temperature starts to rise. Providing a low emissivity infrared reflective layer on the outer surface of the glass would reduce heat loss from the outer pane of glass to the ambient atmosphere. While heat would still be lost by convection, limiting heat loss as infrared radiation may keep the glass sufficiently warm to avoid having the glass cooler than the "dew point" and thereby limit or even prevent the precipitation of dew or frost on the surface.

Most conventional sputtered infrared-reflective films are inadequately durable to be carried on an external glass surface. Such films may withstand short-term exposure to the elements during transportation and storage prior to incorporation in an insulating glass (IG) assembly or an automobile windshield. However, they are insufficiently durable to weather indefinite exposure to the elements and usually are assembled in IG assemblies or windshields where they are shielded from the ambient atmosphere by another pane of glass.

Pyrolytic coatings are deposited on the glass surface using relatively high-temperature chemical vapor deposition (CVD) processes, most commonly by contacting a surface of the cooling glass ribbon in the annealing lehr or in the tin bath of a float glass manufacturing line. Such pyrolytically applied coatings tend to be harder, exhibit a different surface morphology, and are able to better withstand exposure to the elements than sputtered coatings of the same composition and thickness. Hence, pyrolytic coatings are better candidates than sputtered coatings for application of a low emissivity coating on the external surface of a window or other glass article.

Unfortunately, pyrolytic coatings have other drawbacks that have limited their widespread commercial adoption for such purposes. For example, one product having a pyrolytically applied tin oxide low emissivity coating is commercially available under the trade name Energy Advantage from Libbey Owens Ford of Toledo, Ohio, USA. This coating has been considered for automotive windshield applications. It apparently tends to adversely affect bonding of the glass to the tear-resistant plastic sheet in such windshield laminates, requiring that it be used as either the external surface (i.e., facing the ambient environment) or the internal surface (i.e., facing the cabin of the vehicle) of the windshield. Applied to the external surface, the pyrolytically applied coating does not appear to be sufficiently durable to withstand the rigors of many years of chemical exposure to the elements and the physical abrasion such a surface must endure. In addition, it has been observed that this coating is notably more difficult to clean when it becomes dirty and tends to become dirty more readily than standard, untreated glass. As a result, it is not deemed an optimal choice for the external surface of an automobile windshield and it has achieved limited success in the marketplace for this application.

SUMMARY OF THE INVENTION

In one aspect, the present invention provides a glass article that has a low-emissivity water-sheeting coating and a method of applying such a coating. In one embodiment, the invention provides a coated glass article having an exterior surface bearing a low emissivity water-sheeting coating thereon. The coating includes a first pyrolytically applied dielectric layer carried by the exterior surface of the glass article. An exterior layer of silica is sputtered directly onto the outer surface of the first layer, the low emissivity water-sheeting coating reducing the contact angle of water on the coated exterior surface of the glass article below about 15° and causing water applied to the coated exterior surface of the pane to sheet.

A second embodiment of the invention provides an automobile windscreen including an outer pane of glass having an exterior surface and a first bonded surface, an inner pane of glass having an interior surface and a seconded bonded surface, and a tear-resistant polymeric layer disposed between the first bonded surface and the second bonded surface. A low emissivity water-sheeting coating is carried by the exterior surface of the outer pane, the exterior coating including a first dielectric layer pyrolytically applied directly to the exterior surface and an exterior layer of silica sputtered directly onto the outer surface of the first layer, the low emissivity water-sheeting coating reducing the contact angle of water on the coated exterior surface of the glass article below about 15° and causing water applied to the coated exterior surface of the pane to sheet.

One method of the invention renders a surface of a pane of glass resistant to soiling and staining. In accordance with one embodiment of this method, a sheet of glass having a clean interior surface and a clean exterior surface is provided. The exterior surface of this sheet of glass bears a pyrolytically applied dielectric layer having a contact angle with water of at least about 20°. The interior surface of this sheet of glass is coated with a reflective coating by sputtering, in sequence, at least one first dielectric layer, at least one metal layer, and at least one second dielectric layer. The exterior surface of the glass is coated with a water-sheeting coating by sputtering silica directly onto the outer surface of the pyrolytically applied dielectric layer, thereby yielding a low-emissivity water sheeting coating having a contact angle with water below about 15° which causes water applied to the coated exterior surface of the pane to sheet.

In one particularly preferred adaptation of this method, a similar sheet of glass bearing a pyrolytically applied dielectric layer is supplied. A sputtering line is provided, the sputtering line including a series of sputtering chambers each having a support for a sheet of glass therein. At least one of the sputtering chambers comprises a downward sputtering chamber having an upper target positioned above the support, a second of the sputtering chambers comprises an upward sputtering chamber having a lower target positioned below the support. A sheet of glass is positioned on the support in the downward sputtering chamber such that the interior surface is oriented toward the upper target and the upper target is sputtered to deposit a dielectric layer on one of the interior surface of the glass or a film stack layer previously deposited on the interior surface of the glass. The sheet of glass is also positioned on the support in the upward sputtering chamber such that the pyrolytically applied dielectric layer is oriented toward the lower target and the lower target is sputtered to deposit a water-sheeting coating on the exterior surface of the glass.

DETAILED DESCRIPTION OF THE PREFERRED EMBODIMENTS

Figure 1:
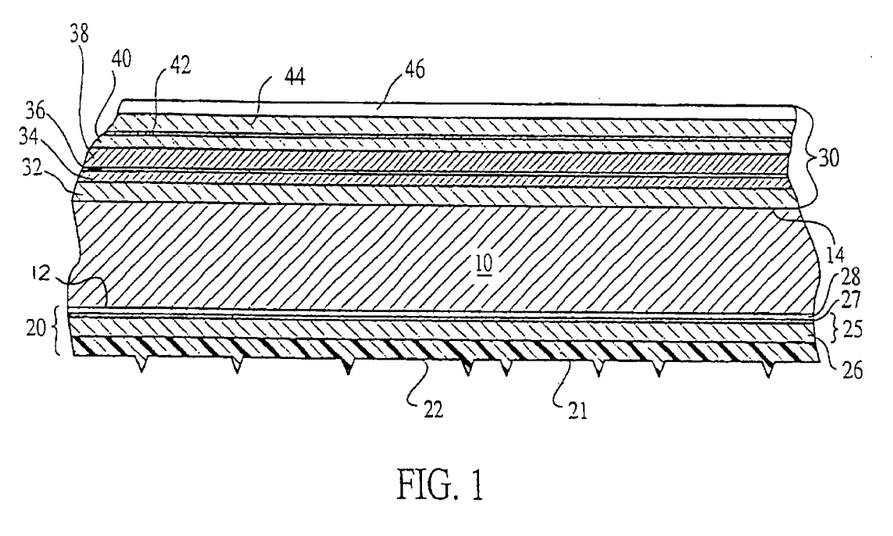
FIG. 1 is a schematic cross-sectional view of a sheet of glass bearing a coating in accordance with the invention.

FIG. 1 schematically illustrates a sheet of glass bearing a pair of coatings in accordance with one useful embodiment of the invention. The sheet of glass 10 includes an exterior face 12 and an interior face 14. (The designation of "interior" and "exterior" face in the ensuing discussion is somewhat arbitrary. It is assumed, though, that in most circumstances the exterior face will be exposed to an ambient environment wherein it may come into contact with dirt, water and the like. The interior face may also be oriented toward the same kind of ambient environment. In the embodiments illustrated in FIGS. 2 and 3, though, this "interior" face is actually protected and a second pane of glass stands between this interior face and the ambient environment.)

Glass substrates 10 suitable for use in connection with the present invention include any of the conventional glass substrates known in the art for the preparation of coated glass articles. A typical glass substrate used in the manufacture of vehicle windows and plate glass is commonly referred to as soda-lime-silica glass. Other suitable glasses may be generally designated as alkali-lime-silica glass, boro-silicate glass, alumino-silicate glass, boro-alumino silicate glass, phosphate glass, fused silica, etc., as well as combinations thereof. A preferred glass sheet 10 is formed of soda-lime-silica glass.

The interior face 14 of the glass 10 bears a reflective coating 30. As those skilled in the art will readily recognize, this reflective coating may take any desired form depending on the desired properties. A wide variety of such films are known in the art and the precise nature of the reflective coating 30 is beyond the scope of the present invention.

If, for example, the glass article is to be used as a mirror, the coating 30 may simply comprise a relative thick layer of a reflective metal. If so desired, a protective coating of a dielectric material may be applied over the surface of the metal opposite the surface in contact with the glass. As is known in the art, this will help protect the metal layer from chemical and physical attack. One could also employ any of a variety of mirror coatings known in the art which comprise a layer of a dielectric on either side of a reflective metal layer; many dichroic mirrors known in the art employ such a structure.

In the embodiment of FIG. 1, the reflective coating 30 is typified as an infrared reflective coating of the type commonly used in low emissivity solar control films. Typically, such films will comprise a metal layer sandwiched between a pair of dielectric layers. This structure may be repeated to further enhance the infra-reflective properties of the film stack. One example of a useful infrared reflective film stack is disclosed in U.S. Pat. No. 5,302,449 (Eby, et al.), the teachings of which are incorporated herein by reference.

The illustrative film stack 30 of FIG. 1 includes a base coat 32 that may comprise one or more layers of dielectric materials. For example, this base coat 32 may comprise zinc oxide applied at a thickness of about 150–275 521 . A first metal layer 34 may be applied directly on top of this base coat 32. This metal may be, for example, silver applied at a thickness of between about 100 Å and about 150 Å. A second dielectric layer 38 may be applied over the first metal layer 34. The thickness of this dielectric layer 38 will depend, at least in part, on whether a second metal layer 40 will be included in the film stack. In a film stack having two metal layers, as shown, this second dielectric layer 38 may typically comprise a relatively thick layer of a metal oxide, such as 700–750 Å of zinc oxide. If so desired, a relatively thin sacrificial layer 36 may be applied between the metal layer 34 and the dielectric layer 38. This will help protect the metal layer 34 during the sputter deposition of the dielectric layer 38. The sacrificial layer 36 may, for example, comprise a layer of titanium metal applied at a thickness of 25 Å or less. This titanium metal will oxidize sacrificially during the application of a metal oxide dielectric 38, limiting any damage to underlying silver layer 34.

In the illustrated film stack, a second metal layer 40 is applied over the second dielectric layer 38. The second metal layer 40 will usually be made of the same material as is the first metal layer 34. For example, this second metal layer 40 may comprise about 125–175 Å of silver. Again, a sacrificial layer 42 of titanium or the like may be applied over the metal layer 40 to protect the metal layer during subsequent deposition of the overlying dielectrics 44 and 46. A third is dielectric layer 44 is applied over the sacrificial layer 42. This dielectric layer 44 can also be a metal oxide, e.g., zinc oxide applied at about 250–300 Å. If so desired, a protective overcoat 46 of another dielectric material can be applied over the dielectric layer 44. In one preferred embodiment, this overcoat 46 may comprise a 50–60 Å layer of $Si_3N_4$.

The low-emissivity water-sheeting coating 20 is carried by the inner surface 12 of the glass. Generally, this water-sheeting coating comprises a pyrolytically applied dielectric layer 25 carried by the exterior surface and an exterior layer 21 of silica sputtered directly onto the outer surface of the first layer. The silica layer 21 is the outermost layer of the low-emissivity water-sheeting coating 20 and the exterior face 22 of the silica layer 21 is the outermost surface of the coated glass article.

It is preferred that the dielectric layer 25 be applied pyrolytically directly on the exterior face 12 of the glass sheet. This pyrolytic layer can be formed of any desired dielectric material(s) that yields a sufficiently durable coating with a commercially acceptable emissivity reduction as compared to plain, uncoated glass. A wide variety of such dielectric coatings are well known in the art and a thorough teaching of all pyrolytic coating techniques and compositions is beyond the scope of the present disclosure. It should be understood that the pyrolytic layer 25 can be a single layer of a single dielectric material. Alternatively, the pyrolytic layer 25 may take the form of a film stack having multiple individual layers achieving a similar function.

One suitable pyrolytically applied dielectric layer for use in accordance with the invention is a pyrolytic tin oxide such as that employed in Libbey-Owens-Ford's Energy Advantage product, mentioned above. Pyrolytically applied low-emissivity tin oxide coatings have been well known in the art for a number of years and a variety of techniques for applying such coatings are described in public literature. While the exact coating in the commercial Energy Advantage product is not fully known, it is believed that any of the widely-know techniques for pyrolytically applying tin oxide will yield a suitable pyrolytic dielectric layer 25.

A number of dopants are known in the art to enhance the conductivity, and hence improve the emissivity, of pyrolytic tin oxide, with fluorine being the most common dopant. One manner of applying a fluorine-doped pyrolytic tin oxide coating is detailed in U.S. Pat. No. 5,698,262 (Soubeyrand et al.), the teachings of which are incorporated herein by reference. While the reader is referred to this patent for a more detailed explanation of such a coating, the disclosure of this patent may be briefly summarized here. Generally, the tin oxide is applied by CVD, wherein selected reactants are combined to form a uniform, vaporized reactant stream which is delivered to the surface of the hot glass substrate. The vaporized reactant stream reacts to deposit a coating of fluorine doped tin oxide on the surface of the hot glass substrate. In the oxidizing atmosphere that must exist at the surface of the hot glass, the organotin coating compounds pyrolytically decompose to form the tin oxide coating.

CVD pyrolytic deposition is typically conducted during the manufacture of glass by the float glass process, and occurs in the float metal bath, the lehr, or in the transition zone between the bath and the lehr, while the glass is still hot. The glass substrate is generally provided at a temperature in the range from about 750° F. to about 1500° F. These are typical temperatures for glass during various stages as it is manufactured by the float glass process.

The CVD reactant stream used by Soubeyrand et al. to deposit the tin oxide includes an organotin coating compound which is vaporized and conveyed to a point at or near the surface of the advancing glass ribbon. Suitable organotin compounds are identified as including dimethyltin dichloride, diethyltin dichloride, dibutyltin diacetate, tetramethyl tin, methyltin trichloride, triethytin chloride, trimethyltin chloride, ethyltin trichloride, propyltin trichloride, isopropyltin trichloride, sec-butyltin trichloride, t-butyltin trichloride, phenyltin trichloride, carbethoxyethyltin trichloride, and the like, as well as combinations thereof. Soubeyrand et al. indicate a preference for dimethyltin dichloride. The organotin compound, and optionally a carrier gas, oxidizer, stabilizer, hydrocarbon, inert gas, and the like are said to be vaporized to form a gaseous organotin reactant stream.

Soubeyrand et al. explain that the vaporized organotin compound may be prepared by any of the procedures set forth in U.S. Pat. Nos. 3,852,098; 2,780,553; 4,351,861; 4,571,350; 3,970,037; 4,212,663; and 4,261,722, each of which is incorporated herein by reference. Soubeyrand et al. state that they prefer to prepare the reactant stream containing the vaporized organotin compound by vaporizing the compound in a thin film evaporator in the presence of a blend gas, as is disclosed, for example, in U.S. Pat. No. 5,090,985, which is also incorporated herein by reference. This gaseous stream, which generally comprises an inert carrier gas such as helium, nitrogen, or argon, or mixtures thereof, may optionally contain oxidizers such as water or oxygen. Preferred carrier gases are said to be helium and nitrogen, and mixtures thereof, containing oxygen as an oxidizer. The resultant reactant stream containing the vaporized organotin compound is generally heated to a temperature from about 250° F. to about 450° F., then conveyed to the reaction zone at the surface of the hot glass substrate.

Gaseous hydrogen fluoride or hydrofluoric acid ("HF" is used herein to refer to either hydrogen fluoride gas or hydrofluoric acid) is combined with the vaporized organotin compounds. Soubeyrand et al. create a separate HF-containing reactant stream generally comprised of HF and a carrier, preferably water vapor. The addition of water to the HF-containing reactant stream is said to lower the emissivity of the coated glass, while increasing the growth rate of the fluorine doped tin oxide deposited. The HF-containing reactant stream may additionally contain conventional adjuvants such as for example helium, nitrogen, or argon, and mixtures thereof, as well as oxidizers such as for example oxygen.

The HF-containing reactant stream is combined with the organotin reactant stream at a point prior to delivery of the reactants to the surface of the hot glass substrate upon which the coating is to be deposited, but preferably in relatively close proximity thereto. The reactant stream containing the HF may be prepared by vaporizing the compound using one of the methods discussed hereinabove relative to the vaporization of the organotin, or by providing the HF as a gas. The vaporized reactant stream containing the HF may be combined with the reactant stream containing the vaporized organotin compound by blending the two gaseous streams prior to delivery to the surface of the hot glass substrate. Alternatively, the HF-containing reactant stream in liquid or solution form may be injected into the hot reactant stream containing the vaporized organotin compound, thereby vaporizing the fluorine-containing solution or liquid compound. After combination, the vaporized reactants of organotin, HF, water and oxygen are delivered to the surface of the hot glass, where they react together to deposit thereon a coating of fluorine doped tin oxide.

Soubeyrand et al. teach exemplary gaseous reactant mixtures which are delivered to the surface of the hot glass substrate as including (all percentages being mole %) from about 10% to about 60% oxygen, from about 2% to about 50% water, and from about 0.2% to about 2% HF, and most preferably includes from about 30% to about 50% oxygen, from about 15% to about 35% water, and from about 0.5% to about 1.5% HF. The uniform, gaseous reactant mixture also includes an organotin compound, the desired concentration of which is a function of the desired thickness of the tin oxide coating and the line speed of the substrate. Thus, Soubeyrand et al. provide the organotin in the gaseous reactant mixture in an amount sufficient to apply a coating of the desired thickness at the desired line speed of the substrate. For typical commercial operations, the gaseous reactant mixture will generally include from about 0.01% to about 8% of the organotin.

Soubeyrand et al. also teach that it is desirable to apply a layer of a material that acts as a sodium diffusion barrier between the exterior surface 12 of the sheet of glass 10 and the fluorine-doped tin oxide coating. They found that coated glass articles exhibited lower emissivity, lower sheet resistance and lower haze when the fluorine-doped tin oxide coating was applied to the glass with a sodium diffusion layer therebetween, as opposed to directly on the glass. This sodium diffusion layer is preferably formed of silica. The layer of silica is preferably formed using conventional CVD techniques.

In Soubeyrand et al.'s preferred embodiment (which is incorporated as the pyrolytic stack 25 shown in FIG. 1), a thin film of tin oxide 28 is first deposited on the exterior surface 12 of the hot glass substrate, with a thin film of silica 27 deposited thereover, so that an underlayer structure of tin oxide/silica is formed intermediate the glass 10 and the subsequently deposited layer 26 of fluorine-doped tin oxide. Soubeyrand et al. indicate that the silica film not only acts as a sodium diffusion barrier but, in combination with the first (undoped) tin oxide film, helps to suppress iridescence in the resulting coated glass article. The use of such "anti-iridescent" layers is disclosed in U.S. Pat. No. 4,377,613, the teachings of which are also incorporated herein by reference.

The silica layer 21 of the low-emissivity water-sheeting coating 20 is desirably deposited directly on the outer surface of the pyrolytic coating 25. As will be discussed below, the exterior face 22 of this silica layer 21 has an irregular surface. (This is schematically shown as a series of irregularly-spaced and -sized spikes on the exterior face 22 of the silica overcoat 21). Accordingly, attributing any specific thickness to this silica layer 21 will be inherently somewhat inaccurate. However, the silica overcoat desirably has a median thickness of between about 15 Å and about 350 Å, with a range of between about 15 Å and about 150 Å being preferred. The major benefit of this overcoat at the least cost is believed to be evidenced at a range of about 20 Å to about 120 Å. One preferred manner in which this silica layer may be applied to the outer surface of the pyrolytic coating 25 will be discussed in more detail below.

Figure 2:
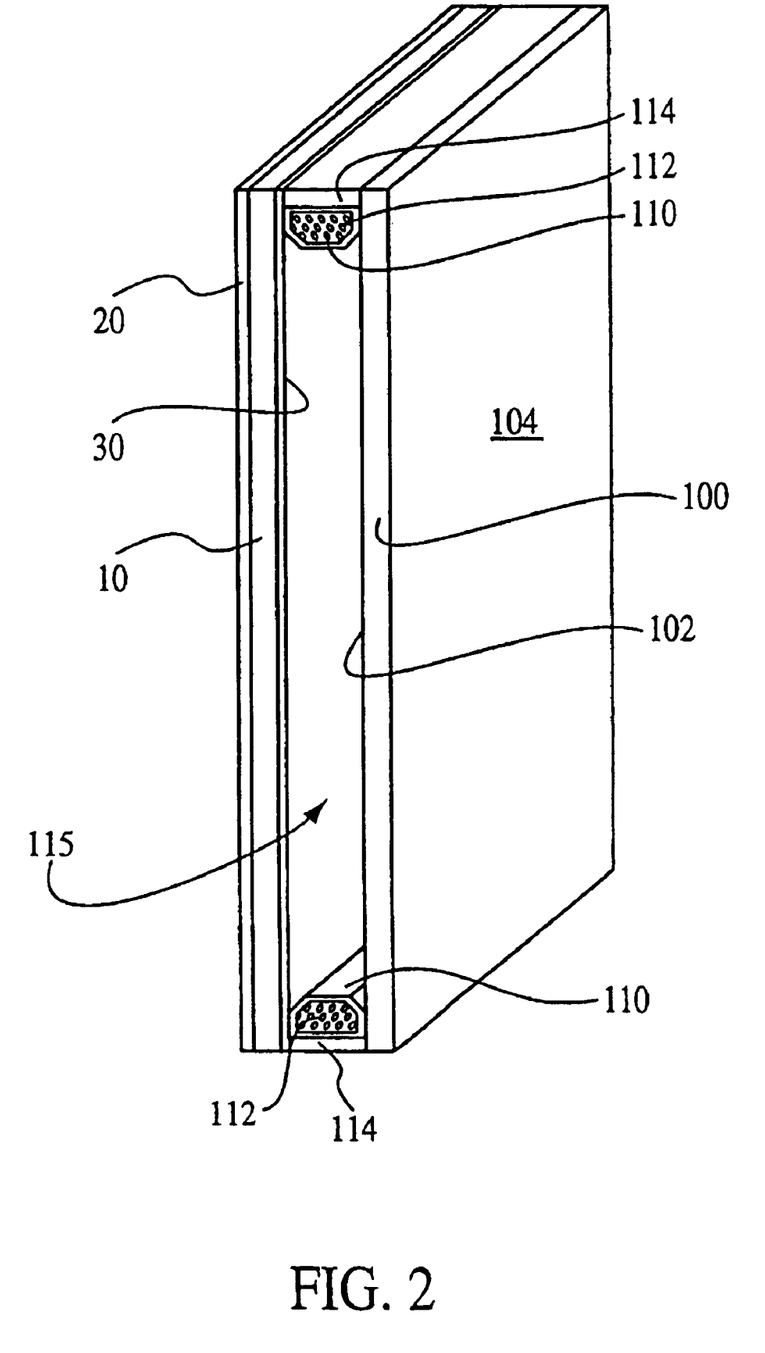
FIG. 2 is a schematic cross-sectional illustration of a multi-pane insulated glass unit incorporating a water-sheeting coating of the intervention.

FIG. 2 is a schematic illustration of a multi-pane insulated glass unit in accordance with a further embodiment of the invention. Insulated glass units are well known in the art and may not be discussed in any significant detail here. Briefly, though, such an insulated glass unit would generally comprise two panes of glass 10,100 held in a spaced-apart relationship by a spacer 110. In this embodiment, the low-emissivity water-sheeting coating 20 carried by the exterior surface of the glass 10 is oriented away from the second pane of glass 100 while the reflective coating 30 carried by the interior face of the glass 10 is oriented toward the second pane of glass 100. The spacer 110 is bonded on one side to the interior surface 102 of the second glass pane 100 and on the other side to the first glass pane 10. As is known in the art, the spacer may be bonded directly to the interior surface 14 of the glass 10 or the reflective coating 30 may extend out to the margins of the glass 10 and the spacer may be attached directly to that coating 30.

Typically, the spacer will be formed of metal or the like and will have a desiccant 112 retained therein. This desiccant will be allowed to communicate with the gas in the interpane space 115 to remove any moisture that may seep between the panes of glass. An exterior seal 114 may be carried around the external periphery of the spacer 110 to form a reliable gas and moisture barrier.

In a modification of the structure shown in FIG. 2, a low-emissivity water-sheeting coating substantially identical to that described above for the coating 20 of FIG. 1 can be applied on the exterior surface 104 of the second glass pane 100. This coating may be employed either instead of or in addition to the coating 20 illustrated on the exterior surface of the first pane 10. Hence, in one embodiment (not shown), the exterior surface 12 of the first glass pane bears a low-emissivity water-sheeting coating; the interior surface 14 of the first glass pane bears a multiple-layer infrared-reflective coating 30; the interior surface 102 of the second glass pane bears no secondary coating; and the exterior surface 104 of the second glass pane bears a second low-emissivity water sheeting coating substantially the same as the coating 20 on the exterior of the first pane.

Figure 3:
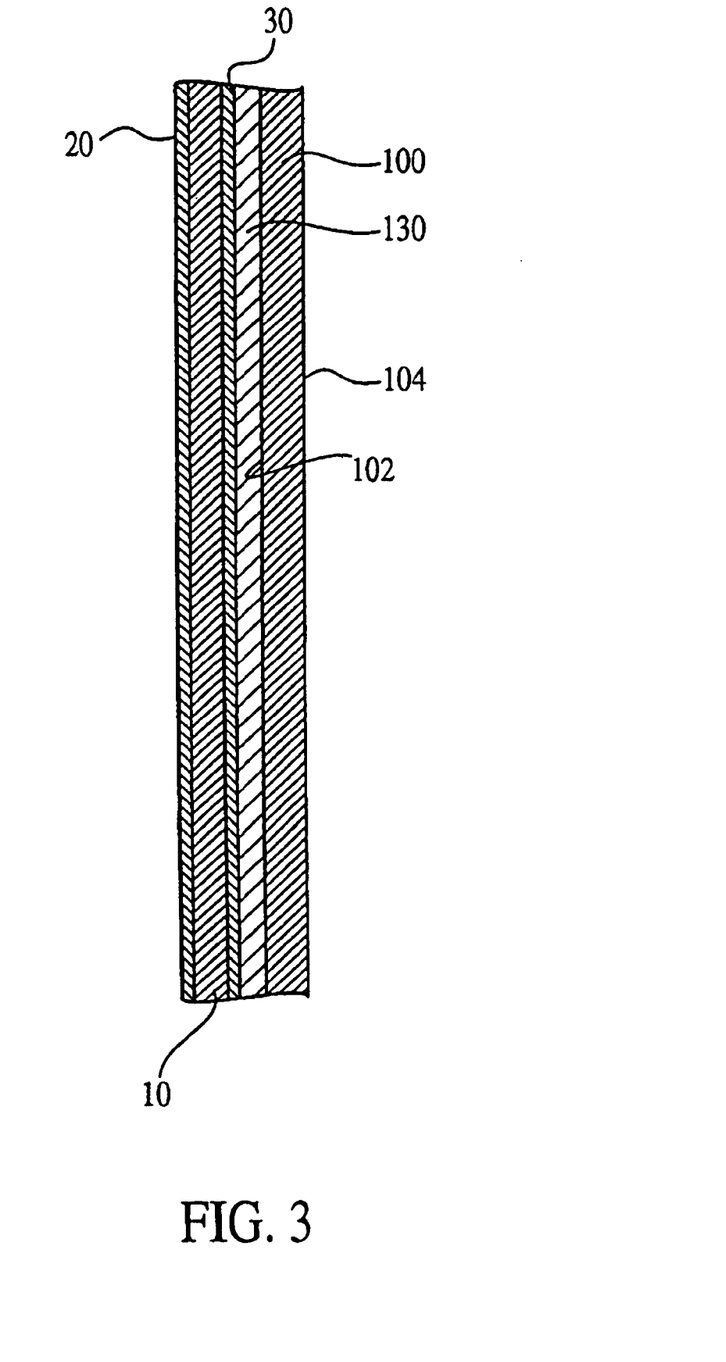
FIG. 3 is a schematic cross-sectional view of a laminated window structure of the type commonly used in automobile windshields bearing a water-sheeting coating of the invention.

FIG. 3 illustrates another application for a coated glass article of the invention. In this embodiment, the glass sheet 10 is bonded to a second sheet of glass 100 by an intermediate tear-resistant plastic film 130 to form a laminated structure. Such laminated window structures are well known in the field of automobile windows. Typically, this plastic layer 130 will take the form of a relatively thick layer of polyvinylbutyral or the like which is heat-fused to the other two sheets of glass. If so desired, the coating 30 may be omitted. More preferably, though, the reflective film 30 will comprise a heat-temperable infrared reflective film. A variety of such films are known in the art and the precise nature of this film is beyond the scope of the present invention, but any suitable heat-temperable coating 30 may be used.

As noted above, the water-sheeting silica layer 21 is desirably applied by sputtering, as is the reflective coating 30, if present. These separate coatings can be applied using conventional sputtering equipment by applying the two coatings in separate passes through a sputtering line. For example, before the reflective coating is applied, the water-sheeting silica overcoat 21 can be applied to the outer surface of the pyrolytic layer 25 by positioning this surface of the glass beneath a silicon target in an oxidizing sputtering atmosphere. Thereafter, a multiple-layer reflective coating can be applied using a series of sputtering chambers in a conventional manner, with each chamber being adapted to sputter one or more specific layers of the desired film stack.

Figure 4:
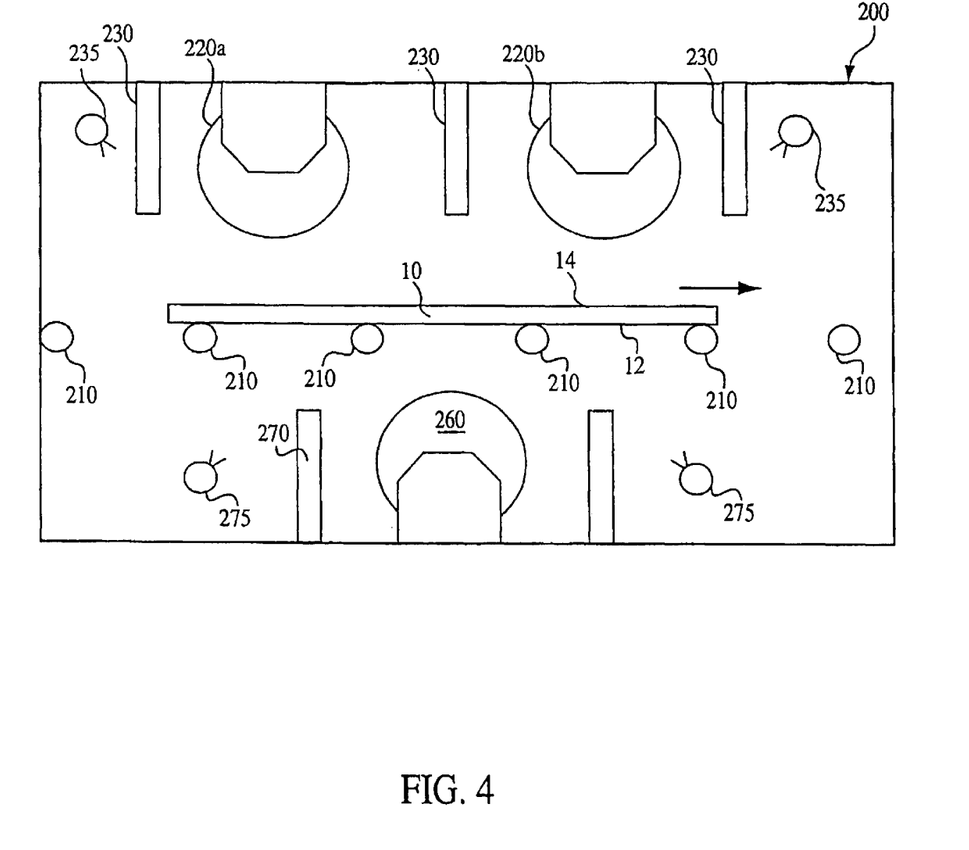
FIG. 4 is a schematic illustration of a dual direction sputtering chamber for use in accordance with the intervention.

FIG. 4 schematically illustrates a dual direction sputtering chamber in accordance with one embodiment of the present invention. Magnetron sputtering chambers are well known in the art and are commercially available from a variety of sources. While a thorough discussion of such magnetron sputtering chambers is beyond the scope of the present disclosure, one relatively useful structure for such a device is disclosed in U.S. Pat. No. 5,645,699 (Sieck), the teachings of which are incorporated herein by reference.

Generally speaking, magnetron sputtering utilizes a target formed of a metal or dielectric that is to be deposited on the substrate. This target is provided with a negative charge and a relatively positively charged anode is positioned adjacent the target. By introducing a relatively small amount of a desired gas into the chamber adjacent the target, a plasma of that gas can be established. Atoms in this plasma will collide with the target, knocking the target material off the target and sputtering it onto the substrate to be coated. It is also known in the art to include a magnet behind the target to help shape the plasma and focus the plasma in an area adjacent the surface of the target.

In FIG. 4, the sheet of glass 10 to be coated is positioned on a plurality of support rollers 210, which are spaced along the length of the sputtering chamber 200. While the precise spacing of these rollers 210 can be varied, for reasons explained more fully below, it is desired that these rollers are spaced a little bit farther apart along at least a interim length of the chamber 200 to increase the effective coating area from the lower target 260.

In the illustrated embodiment, the sheet of glass 10 is oriented to travel horizontally across these rollers, e.g., from left to right. The interior surface 14 of the glass is oriented upwardly while the pyrolytic dielectric layer 25 on the exterior surface 12 of the glass is oriented downwardly to rest on the rollers 210. (While this is probably the most typical configuration, it should be understood that the relative orientation of the glass within the sputtering chamber 200 can be switched so long as the relative positions of the upper targets 200 and the lower target 260 are also reversed. As a consequence, it should be noted that designating these targets as "upper" and "lower" targets is simply for purposes of convenience and the relative orientation of these elements within the sputtering chamber can easily be reversed if so desired.)

The sputtering chamber 200 shown in FIG. 4 includes two spaced-apart upper sputtering targets 220a and 220b. While these targets can be planar targets, they are illustrated as being so-called rotary or cylindrical targets. These targets are arranged generally parallel to one another with a plurality of anodes 230 extending horizontally and generally parallel to these targets. As suggested in U.S. Pat. No. 5,645,699, an intermediate anode 230 may also be positioned between these two targets.

A gas distribution system is used to supply the sputtering gas to the chamber adjacent the targets 220a and 220b. While a variety of gas distribution systems are known in the art, this distribution system may simply comprise a pair of pipes 235 with a plurality of spaced-apart openings or nozzles oriented generally toward the target.

The use of multiple targets positioned above a glass substrate in a magnetron sputtering chamber is fairly conventional in the field. The unique aspect of the sputtering chamber 200 FIG. 4, though, is the presence of the "lower" target 260. This target is the target used to sputter the water-sheeting silica overcoat 21 of the invention directly on the outer surface of the pyrolytic layer 25. As with the upper targets 220a and 220b, the lower target 260 is provided with at least one, and preferably two, anodes 270 in sufficient proximity to establish a stable plasma. The gas distribution pipes 235 shown adjacent the upper targets 220a and 220b are undesirably far from the lower target 260 and the intermittent presence of the glass 10 will effectively divide the sputtering chamber 200 into two separate functional areas. Accordingly, it is preferred to have separate gas distribution pipes 275 positioned beneath the gas adjacent the lower target 260 to ensure a consistent supply of gas for the plasma adjacent the target. If so desired, the lower pipes 275 and the upper pipes 235 may be parts of the same gas distribution system, i.e., both sets of pipes can be connected to a single gas supply.

The nature of the gas supplied by the lower pipes 275 will depend at least in part on the nature of the sputtering target 260. In conventional magnetron sputtering, the target must serve as a cathode. Due to the dielectric nature of $SiO_2$, it can be exceedingly difficult to reliably sputter using a silica target. Consequently, it is preferred that the target comprise silicon metal rather than silica. The material actually deposited on the exterior surface 12 of the glass can be converted to silica by including oxygen in the gas supplied through the lower gas distribution pipes 275.

While the successive sheets of glass 10 will effectively divide the sputtering chamber, this does not preclude gas introduced in one area of the chamber from travelling elsewhere in the chamber. As it is preferred that the lower target 260 comprise silicon metal sputtered in an oxidizing atmosphere, it is important that the sputtering of the upper targets 220a and 220b not be adversely affected by the presence of any excess oxygen which may be introduced through the lower pipes 275. This may effectively preclude the use of this dual direction sputtering chamber 200 to deposit the water-sheeting silica overcoat 21 on one side of the glass sheet and an oxygen-sensitive metal on the other surface.

More advantageously, the dual direction sputtering chamber of FIG. 4 can be used to deposit a dielectric layer on the interior surface 14 of the glass and the water-sheeting silica layer 21 on the pyrolytic dielectric layer 25 in a single chamber. The sputtered dielectric may be a nitride or the like so long as the introduction of some metal oxide into the nitride being deposited will not adversely affect the coating being applied. Ideally, though, the dielectric being applied to the interior surface 14 is an oxide (or at least a partial oxide) so that any commingling of the gases introduced through the two sets of pipes 235 and 275 will not adversely affect either the dielectric layer or the silica layer 21. For example, one or both of the targets 220a and 220b may be made of titanium metal or $TiO_x$ (where $1<X<2$) and the gas introduced through both sets of gas distribution pipes 235 and 275 may comprise an appropriately balanced mixture of argon and oxygen.

In conventional magnetron sputtering chambers, the spacing of the rollers 210 used to support the glass is kept fairly small to permit smaller glass substrates to be processed on the line without any significant risk of having the glass fall between the rollers. In order to minimize the interference of the rollers in applying the water-sheeting coating on the exterior surface 12 of the glass, though, this spacing may be increased. The maximum safe spacing will need to be determined on a case-by-case basis for a given range of anticipated glass sizes. However, the larger the spacing between the rollers disposed in the path from the lower target 260 to the pyrolytic coating on the exterior surface 12 of the glass, the greater the percentage of the sputtered silica which will be deposited on the pyrolytic dielectric 25. Of course, the rollers in other areas of the sputtering apparatus can be maintained at their normal spacing. It may be desirable to make a few of the rollers in the dual direction sputtering chamber 200 easily removed so the chamber can be converted from the illustrated configuration to a more conventionally operated chamber coating only one side of the glass and having rollers spaced more closely together.

Instead of changing the spacing between the rollers, the rollers could instead be made smaller in diameter. Conventional rollers are hollow metal tubes. If so desired, the smaller diameter rollers can be stiffened, e.g., by filling them with a rigid foam. In order to maintain the same transport speed of the glass along the support, these smaller-diameter rollers would have to be turned more rapidly, e.g., by means of a pair of gears having the desired gear ratio.

The rollers 210 can be of any conventional structure. It has been found that good results can be obtained by employing cylindrical aluminum rollers about which a rope of Kevlar™ is spirally wound, with the Kevlar™ providing the surface with which the glass is in direct contact.

In some specific applications, the dual direction sputtering chamber 200 of FIG. 4 may be sufficient to apply the entire desired coating to both the interior and exterior surfaces of the glass. More often, though, the sputtering chamber 200 would be part of a sputtering line comprising a series of sputtering chambers. Each sputtering chamber in the line could include both an upper target and a lower target, but in most conventional applications the film stack applied to the upper surface of the glass will be more complex (i.e., will comprise a series of distinct layers of varying composition) and thicker than is the silica overcoat 21 of the invention. Consequently, a majority of the sputtering chambers can comprise conventional, downward sputtering chambers having only an upper target, with no target positioned beneath the supports.

If the sputtering line comprises a combination of downward sputtering chambers and dual direction sputtering chambers 200, the position of the dual direction chambers along the sputtering line can be varied. If the water-sheeting silica overcoat 25 of the invention is applied by sputtering a silicon-containing target (e.g., one formed primarily of silicon or formed of silicon doped with aluminum) in an oxidizing atmosphere, one should not attempt to deposit an oxidizable metal layer (e.g., an infrared reflective silver layer of the type conventionally used in low emissivity film stacks) on the upper surface of the glass in the same chamber. Accordingly, at least those chambers used to sputter a metal layer may be operated as a downward sputtering chamber by omitting the lower target. It would be possible, though, to deposit a metal oxide (e.g., $SiO_2$, ZnO or $SnO_2$) on the upper surface of the glass in the same chamber.

Conventional wisdom would suggest to one skilled in the art that the water-sheeting silica overcoat of the invention be applied in the first sputtering chamber or, if necessary, the first several sputtering chambers to make sure that the water-sheeting coating is applied before the glass surface is damaged or soiled by contact with the rollers supporting the glass within the chambers. Quite surprisingly, it has been found that the opposite is true—the silica overcoat 21 of the invention is optimally applied in the last sputtering chamber. If more than one dual direction sputtering chamber 200 is necessary to deposit a sufficiently thick water-sheeting overcoat without unduly slowing down glass speed through the sputtering line, the water-sheeting overcoat is optimally applied in the last few sputtering chambers.

If the water-sheeting silica overcoat 21 of the invention is applied at the beginning of the sputtering line, the majority of the exterior surface of the glass will exhibit the desired water-sheeting properties. However, the margins of the glass may not exhibit these improved properties on a consistent basis. This is believed to be due to a slight overspray of the coating applied to the upper surface of the glass after deposition of the silica 21, wherein a very small amount of the material being applied to the upper surface will drift down to the lower surface and overlie the low-emissivity water-sheeting coating adjacent the edges of the glass sheet. While this oversprayed coating is thin enough as to have no readily discernable effect on the optical properties of the glass, this virtually invisible coating compromised the benefits of the water-sheeting coating around the edges of the glass. By applying the silica to the pyrolytically coated exterior surface of the glass toward the end of the sputtering line, the amount of overspray deposited on top of the silica overcoat can be minimized and the beneficial water-sheeting effects of this coating can be preserved.

A dual direction sputtering chamber 200 such as that shown in FIG. 4 is believed to minimize the cost and maximize production efficiency in applying coatings to both sides of the sheet of glass. Less desirably, a water-sheeting coating of the invention could be applied in one pass while the reflective coating is applied to the other side of the glass in a second pass, flipping the glass between the passes to permit all of the targets to be positioned on the same side of the supports in the chamber(s). This is much less efficient than the process outlined above, though, and is not believed to be suitable for low-cost commercial glass production.

As the glass substrate moves through the chamber, there will be times when the glass does not effectively shield the upper targets 200a and 200b from the lower target 260 or vice versa. Consequently, material from the upper targets will be deposited on the lower target and material from the lower target can be deposited on one or both of the upper targets. The sputtering chamber 200 of FIG. 4 is ideal if the upper targets 220a, 220b and the lower target 260 have substantially the same composition. If the upper targets have a different composition from the lower target, though, the cross-contamination of the different targets can lead to problems in sputtering or in maintaining consistent product quality.

At least in theory, this problem may be overcome by independently controlling the power supplied to each of the sputtering targets to ensure that each target is sputtering only when the glass is positioned to shield the upper and lower targets from one another. Current commercially available power supply controllers are not configured in this fashion, however. Furthermore, the control logic for such an arrangement can be unduly difficult if the sputtering line is used to coat glass substrates of varying sizes rather than a consistent size.

Figure 5:
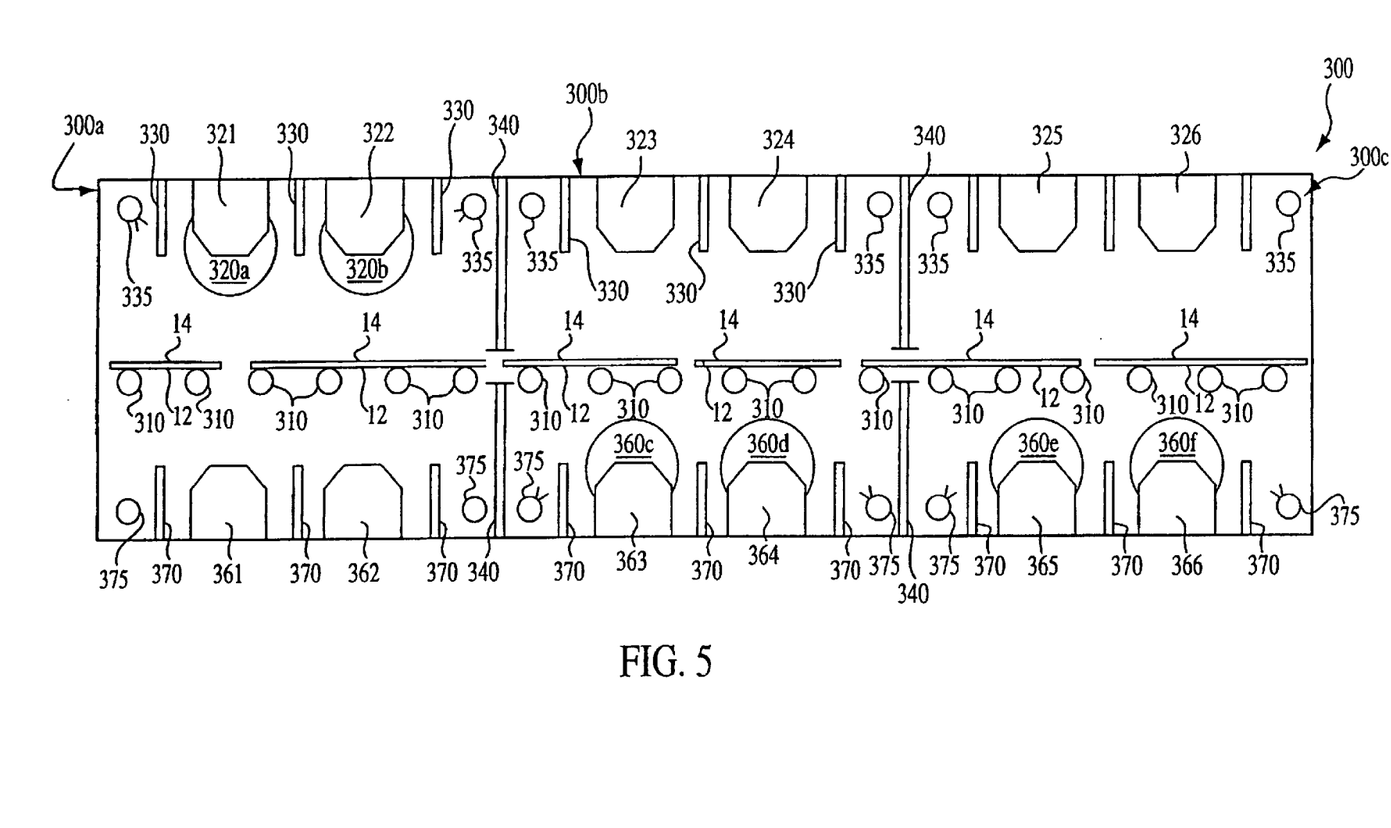
FIG. 5 is a schematic illustration of a multiple-zone dual direction sputtering chamber for use in accordance with another embodiment of the invention.

FIG. 5 illustrates one possible sputtering chamber 300 which can be used to coat both the interior surface 14 and the pyrolytically coated exterior surface 12 of the substrate in a single pass without significant cross contamination of the sputtering targets. Elements serving an analogous function to elements shown in FIG. 4 bear like reference numbers, but indexed by 100, e.g., the upper gas distribution pipes 335 of FIG. 5 are functionally analogous to the upper gas distribution pipes 235 of FIG. 4.

The sputtering chamber 300 of FIG. 5 is effectively divided into three coating zones 300a, 300b and 300c by a pair of barriers 340. Some fraction of the gas in one coating zone may flow into another coating zone, so it is best to use a similar atmosphere in all three zones. However, the barriers 340 serve to effectively limit the amount of material sputtered in one coating zone that lands on a target in another coating zone.

In the embodiment of FIG. 5, each of the three coating zones 300a–300c is adapted to hold up to four targets, with two targets positioned above the substrate and two positioned below the substrate. Hence, there are six upper target mounts 321–326 positioned above the path of the glass and six lower target mounts 361–366 positioned beneath the path of the glass. This allows maximum flexibility in using this single multi-zone sputtering chamber 300 to manufacture products having different properties. FIG. 5 schematically illustrates each of the upper target mounts 321–326 vertically aligned with one of the lower target mounts 361–366, respectively. It should be understood, however, that the targets need not be vertically aligned in this fashion and may be more advantageously positioned in a horizontally staggered arrangement.

In the configuration shown in FIG. 5, the first coating zone 300a has two upper targets (320a and 320b), but no lower targets on the lower target mounts 361 or 362. While a sputtering gas should be supplied to the upper gas distribution pipes 335 and power should be supplied to the upper anodes 330 in the first coating zone, there is no need to deliver any gas to the lower gas distribution pipes 375 or any power to the lower anodes 370. The second coating zone 300b has two lower targets 360c and 360d, but neither of the upper target mounts 323 and 324 carry sputtering targets. Similarly, the third coating zone 300c has two lower targets 360e and 360f, but neither of the upper target mounts 325 and 326 carry sputtering targets. Optimally (as discussed above), the first coating zone 300a is used to apply the outermost layer of the reflective film stack carried by the interior surfaces 14 of the substrates while the last two coating zones 300b and 300c are used to sputter the water-sheeting silica overcoat 21 on the pyrolytically coated exterior surfaces 12 of the substrates.

The arrangement of targets in the multiple-zone sputtering chamber 300 of FIG. 5 is merely illustrative and it should be understood that the target arrangement can be varied to maximize production efficiency for different products. For example, if a thicker water-sheeting coating is desired at the same glass speed, a silicon-containing target can be mounted on each of the lower target mounts 361–366 while none of the upper target mounts 321–326 carry a target. If a thinner coating will suffice (or if glass speed through the coating chamber is suitably reduced), only the last two lower target mounts 325 and 326 can be provided with targets while each of the first four upper target mounts 321–324 carry sputtering targets. Of course, any one or more of the coating zones 300a–300c can be operated much like the dual-direction sputtering chamber 200 of FIG. 4 by mounting targets in the upper and lower target mounts of the same zone.

The apparatus of FIGS. 4 and 5 and the method of depositing coatings using such coating systems is discussed in the present application primarily in the context of applying a reflective film stack on one side of the glass and a water-sheeting silica overcoat on the other side of the glass. It is to be understood, however, that this apparatus and method can be used to apply coatings to both sides of a pane of glass regardless of the nature of the coatings applied thereto. For example, the apparatus can be used to apply an anti-reflective coating on both sides of a pane of glass, to apply infrared reflective coatings to both sides of a transparent or translucent organic substrate, or to apply a water-sheeting coating to each side of the same substrate.

The advantage of the systems illustrated in FIGS. 4 and 5 is that a substrate can be provided with a sputtered coating (regardless of composition) on both sides in a single pass through the coating apparatus while the glass is maintained in a constant orientation, i.e., wherein it does not need to be flipped, turned or otherwise manipulated. This enables the use of a simple set of standard transport rollers to move the glass along the production line. In the absence of the present invention, one typically would have to either manually handle the glass to flip it and send it back through the coating apparatus in a separate run, or use a complex glass handling system which must hold the substrate and flip it at some point during the production process. This enables glass having coatings on both sides to be produced particularly economically without any loss in coating quality.

In the past, it was assumed that even if one were to coat the bottom side of the glass, contact with the rollers would mark that coating or and/or damage the bottom surface of the glass prior to application of the coating. Surprisingly, however, the present invention demonstrates that both sides of the glass can be coated in a single pass with excellent results.

The precise operating conditions (e.g. target composition, plasma composition, etc.) under which the water-sheeting overcoat of the invention is applied can be varied as necessary to optimize the deposition of a coating of the desired thickness. Given the present teaching as a guide, one of ordinary skill in the art should be able to select suitable operating conditions to apply a coating 20 of the invention without undue experimentation.

An overcoat of $SiO_2$ in accordance with the invention may be sputter deposited using a silicon dioxide target in an inert atmosphere, but silica is a poor conductor and it can be difficult to sputter such dielectric materials in a DC sputtering apparatus. One could instead use a pure silicon target in an oxidizing atmosphere, but such targets are difficult to sputter in a consistent, controlled fashion because silicon is a semiconductor. To improve sputtering and; reduce arcing, it is preferred that a target comprising silicon with about 5% aluminum be sputtered in an oxidizing atmosphere.

Even if an aluminum-doped silicon target is employed, the atmosphere in the sputtering chamber can be varied to achieve the optimum sputtering rate. While the sputtering atmosphere should be oxidizing, it need not be pure oxygen. To the contrary, a mixture of oxygen and an inert gas will enhance the sputtering rate. It is believed that a sputtering gas comprising oxygen and up to about 40% argon (preferably 0–20% argon) maintained at about $3\times10^{-3}$ mbar will suffice. The power applied to the sputtering target should be optimized to reduce arcing yet maximize sputtering rate. A power of up to about 80 kW should yield acceptable results.

One manufacturing arrangement which has been found to work well utilizes three rotary sputtering targets of silicon doped with about 5% aluminum, with a power of about 42 kW being applied to each target. The atmosphere in the sputtering chamber comprises 100% $O_2$ at a pressure of about 2.5–4.5 mTorr. The glass substrate is moved past these sputtering targets at about 225–500 inches per minute.

Some initial analysis of the morphology of thin $SiO_2$ films sputtered on a glass surface has been conducted. While no detailed microscopic morphology studies have been conducted on silica overcoats applied to pyrolytically applied dielectric layers, there are some similarities in the water-sheeting properties of those films and the present low-emissivity water-sheeting coatings 20. Hence, the conclusions of the morphology of the plain silica coatings are believed to give some indication of the morphology of coatings 20 of the present invention.

The initial analysis of thin silica films applied to a plain glass surface shows that the exterior surface of such silica films exhibit a series of spaced-apart projections rising from the surface of the glass. It also appears that these coatings are relatively non-porous. This is in sharp contrast to the sol gel-derived coatings taught in Takamatsu et al.'s U.S. Pat. No. 5,394,269, which are said to yield coatings having pores on the order of 50–200 nm penetrating the coating.

For reasons which are not currently understood, analysis of silica films applied directly to a clean glass surface suggests that sputter depositing such thin silica films yields a surface having a series of fairly sharp, distinct peaks. No meaningful statistical analyses of such coated surfaces have been performed, so it is not known if these unique surface irregularities are representative of the entire silica surface. That being said, this data does suggest that the exterior surface 22 of the low-emissivity water-sheeting coating 20 of the invention should be relatively non-porous and differs from an untreated float glass surface in that it is significantly more uneven and irregular, having a number of discrete, spaced-apart peaks rising significantly above the rest of the surface.

The behavior of a sheet of glass coated with a water-sheeting coating of the invention is visibly different from that of a similar sheet of glass not bearing the present coating. A glass surface bearing a low-emissivity water-sheeting coating 20 tends to sheet water more readily and is noticeably easier to clean without any visible streaks or defects than is a comparable sheet of glass bearing a similar pyrolytic low-emissivity coating without the silica overcoat 21 of the invention.

By way of example, a sample of a sheet of Energy Advantage glass was obtained commercially. As explained above, this product bears a pyrolytically applied dielectric coating which is believed to be a three-layer coating 25 such as that shown in FIG. 1 and discussed above. The pyrolytically coated surface was relatively rough, at least as compared to the upper surface (i.e., the side facing away from the tin bath in the float process) of a sheet of plain float glass without any such coating. A conventional cleaning solution commercially available under the trademark Windex was sprayed on the pyrolytically coated surface of the Energy Advantage pane and the surface was wiped with a paper towel until the surface appeared dry and no longer showed any visible streaks, taking qualitative note of the time and wiping force necessary to complete such cleaning. A water-sheeting silica overcoat 21 of the invention was applied to an outer surface of the pyrolytically coated surface of another sample of the Energy Advantage product and this same Windex wiping test was conducted on the resulting coated surface. The plain Energy Advantage pyrolytic coating had a rough surface and could be described as having a "sticky" or high-friction feel during wiping. The second sample bearing a low-emissivity water-sheeting coating 20 of the invention was substantially easier to clean, with wiping being completed more quickly and with less force.

The change in surface properties brought about by the present invention are readily discernable on a qualitative level, but it can be more difficult to quantify these differences in a meaningful manner. In addition, the exact physical cause for this significant improvement in surface behaviour is not fully understood. One quantifiable change in the pyrolytically coated surface prior to treatment compared to the coating of the invention including a silica overcoat 21 is a marked reduction in contact angle. The contact angle of water on plain Energy Advantage pyrolytic coatings appears to vary significantly, with measured contact angles ranging from a lower limit of about 25° to as high as 58°. The contact angle of water on an Energy Advantage pyrolytic coating bearing a silica overcoat of the invention was substantially lower, with most measurements falling well below 15°. As a matter of fact, the contact angle for such a coating was routinely measured on the order of 7–8°.

In accordance with a preferred embodiment of the invention, the pyrolytically applied dielectric layer 25 carried by the exterior surface 12 of the glass 10 has a rough outer surface, which is believed to result from the pyrolytic coating process. The dielectric layer 25 has a contact angle with water of at least about 20°, desirably at least about 25° and preferably 30° or more. Once the silica overcoat 21 is applied to the outer surface of the dielectric layer 25, the contact angle of water on the exterior surface 22 of the resultant low-emissivity water-sheeting coating 20 is desirably no more than about 25°, preferably no more than about 20°, and optimally 15° or less. This significant reduction in contact angle will tend to cause water on the coated surface of the glass pane to sheet, making the glass surface easier to clean and more likely to stay clean, but it is not believed that the sputtered silica overcoat 21 will significantly impair the emissivity-reducing properties of the underlying pyrolytically applied dielectric layer 25.

While a preferred embodiment of the present invention has been described, it should be understood that various changes, adaptations and modifications may be made therein without departing from the spirit of the invention and the scope of the appended claims.

What is claimed is:

1. A coated glass article having an exterior surface bearing a low emissivity water-sheeting coating thereon, said coating comprising a first pyrolytically applied dielectric layer carried by the exterior surface and an exterior layer of substantially non-porous silica sputtered directly onto an outer surface of the first layer, the low emissivity water-sheeting coating reducing the contact angle of water on the coated exterior surface below about 25° and causing water applied to the coated exterior surface to sheet.

2. The coated glass article of claim 1 wherein the first layer comprises a layer of tin oxide deposited on the exterior surface of the glass by reacting at a temperature of at least about 750° C. a reactant mixture comprising an organotin compound, water and oxygen.

3. The coated glass article of claim 1 wherein the first layer comprises a fluorine-doped metal oxide.

4. The coated glass article of claim 3 wherein the first layer comprises a fluorine-doped tin oxide deposited by reacting a reactant mixture comprising an organotin compound, HF, water and oxygen.

5. The coated glass article of claim 1 further comprising an interior surface bearing a reflective coating thereon.

6. The coated glass article of claim 5 wherein the reflective coating is an infrared reflective coating comprising, in sequence moving outwardly from the interior surface, at least one dielectric layer, a reflective metal layer and a second dielectric layer, the infrared reflective coating having a transmittance of at least about 70% in the visible spectrum.

7. An automobile windscreen comprising:

a) an outer pane of glass having an exterior surface and a first bonded surface;

b) an inner pane of glass having an interior surface and a second bonded surface;

c) a tear-resistant polymeric layer disposed between the first bonded surface and the second bonded surface;

d) a low emissivity water-sheeting coating carried by the exterior surface of the outer pane, the low emissivity water-sheeting coating comprising a first pyrolytically applied dielectric layer carried by the exterior surface and an exterior layer of substantially non-porous silica sputtered directly onto an outer surface of the first layer, the low emissivity water-sheeting coating reducing the contact angle of water on the coated exterior surface below about 25° and causing water applied to the coated exterior surface to sheet.

8. The windscreen of claim 7 wherein the first dielectric layer comprises a metal oxide.

9. The windscreen of claim 7 wherein the first dielectric layer comprises a fluorine-doped metal oxide.

10. The windscreen of claim 7 further comprising an infrared reflective coating carried by one of the first and second bonded surfaces, the infrared reflective coating comprising, in sequence moving outwardly from the surface by which it is carried, at least one dielectric layer, a reflective metal layer and a second dielectric layer, the infrared reflective coating having a transmittance of at least about 70% in the visible spectrum.

11. A method of rendering a surface of a pane of glass resistant to soiling and staining, comprising:
   a) providing a sheet of glass having a clean interior surface and a clean exterior surface, the exterior surface bearing a pyrolytically applied dielectric layer having a contact angle with water of at least about 30°;
   b) coating the interior surface of the sheet of glass with a reflective coating by sputtering, in sequence, at least one fist dielectric layer, at least one metal layer, and at least one second dielectric layer;
   c) coating the exterior surface of the glass with a water-sheeting coating by sputtering substantially non-porous silica directly onto the outer surface of the pyrolytically applied dielectric layer, thereby yielding a low-emissivity water sheeting coating having a contact angle with water below about 25° which causes water applied to the coated exterior surface of the pane to sheet.

12. The method of claim 11 wherein the sheet of glass is passed through a series of sputtering chambers retaining a corresponding series of sputtering targets spaced outwardly from the interior surface of the sheet of glass, the first dielectric layer being applied in a first of the sputtering chambers, the metal layer being applied in a second of the sputtering chambers and the second dielectric layer being applied in a third of the sputtering chambers.

13. The method of claim 12 wherein one of the first and third sputtering chambers includes a silicon-containing target spaced outwardly from the exterior surface of the sheet of glass, the water-sheeting coating being applied by sputtering the silicon-containing target in the same sputtering chamber in which one of the dielectric layers is applied.

14. A method of rendering a surface of a pane of glass resistant to soiling and staining, comprising:
   a) providing a sheet of glass having a clean interior surface and a clean exterior surface, the exterior surface bearing a pyrolytically applied dielectric layer having a contact angle with water of at least about 30°;
   b) providing a sputtering line comprising a series of sputtering chambers each having a support for a sheet of glass therein, at least one of the sputtering chambers comprising a downward sputtering chamber having an upper target positioned above the support, a second of the sputtering chambers comprising an upward sputtering chamber having a lower target positioned below the support;
   c) positioning the sheet of glass on the support in the downward sputtering chamber such that the interior surface is oriented toward the upper target and sputtering the upper target to deposit a dielectric layer on one of the interior surface of the glass or a film stack layer previously deposited on the interior surface of the glass;
   d) positioning the sheet of glass on the support in die upward sputtering chamber such that the pyrolytically applied dielectric layer is oriented toward the lower target and sputtering the lower target to deposit a water-sheeting coating comprising substantially non-porous silica on the exterior surface of the glass.

15. The method of claim 14 wherein the upward sputtering chamber further comprises an upper target positioned above the support, further comprising sputtering the upper target to deposit a dielectric layer on one of the interior surface of the glass or a film stack layer previously deposited on the interior surface of the glass while the sheet of glass remains in the upward sputtering chamber.

16. The coated glass article of claim 1 wherein said exterior layer of silica has a median thickness of between about 15 angstroms aid about 350 angstroms.

17. The coated glass article of claim 16 wherein said exterior layer of silica has a median thickness of between about 15 angstroms and about 150 angstroms.

18. The coated glass article of claim 17 wherein said exterior layer of silica has a median thickness of between about 20 angstroms aid about 120 angstroms.

19. The coated glass article of claim 1 wherein said exterior layer of silica is the outermost layer of the of the low emissivity water-sheeting coating.

20. The coated glass article of claim 19 wherein said first dielectric layer is applied directly on the exterior surface of the glass article.

21. The windscreen of claim 7 wherein said exterior layer of silica has a median thickness of between about 15 angstroms and about 350 angstroms.

22. The windscreen of claim 21 wherein said exterior layer of silica has a median thickness of between about 15 angstroms and about 350 angstroms.

23. The windscreen of claim 22 wherein said exterior layer of silica has a median thickness of between about 20 angstroms and about 120 angstroms.

24. The windscreen of claim 7 wherein said exterior layer of silica is the outermost layer of the of the low emissivity water-sheeting coating.

25. The windscreen of claim 24 wherein said first dielectric layer is applied directly on the exterior surface of the glass article.

* * * * *